United States Patent
Arslan et al.

(10) Patent No.: US 12,475,310 B2
(45) Date of Patent: Nov. 18, 2025

(54) METHOD AND APPARATUS FOR HARDWARE ACCELERATED DATA PARSING, PROCESSING AND ENRICHMENT

(71) Applicant: HAVELSAN HAVA ELEKTRONIK SANAYI VE TICARET ANONIM SIRKETI, Ankara (TR)

(72) Inventors: Caglar Arslan, Ankara (TR); Fatih Furkan Bayar, Ankara (TR)

(73) Assignee: HAVELSAN HAVA ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 520 days.

(21) Appl. No.: 18/004,073

(22) PCT Filed: Jul. 6, 2020

(86) PCT No.: PCT/TR2020/050589
§ 371 (c)(1),
(2) Date: Jan. 3, 2023

(87) PCT Pub. No.: WO2022/005409
PCT Pub. Date: Jan. 6, 2022

(65) Prior Publication Data
US 2023/0342543 A1     Oct. 26, 2023

(30) Foreign Application Priority Data
Jul. 3, 2020  (TR) ................................ 2020/10610

(51) Int. Cl.
*G06F 40/205*     (2020.01)

(52) U.S. Cl.
CPC ................................. *G06F 40/205* (2020.01)

(58) Field of Classification Search
CPC ..................................................... G06F 40/205
See application file for complete search history.

(56) References Cited

U.S. PATENT DOCUMENTS

| | | | |
|---|---|---|---|
| 8,782,514 B1* | 7/2014 | Chiu ..................... | G06F 40/143 707/790 |
| 9,633,097 B2* | 4/2017 | Tidwell .................... | G06F 21/71 |
| 10,621,192 B2* | 4/2020 | Henrichs ................ | G06F 16/283 |
| 10,902,013 B2* | 1/2021 | Lancaster ............. | G06F 16/285 |
| 10,949,442 B2* | 3/2021 | Henrichs ............. | G06F 11/3068 |

(Continued)

*Primary Examiner* — Anne L Thomas-Homescu
(74) *Attorney, Agent, or Firm* — Bayramoglu Law Offices LLC

(57) ABSTRACT

A data parser/processor and enricher accelerated by making use of at least one hardware accelerator or a finite state automata (i.e. FPGA, CPLD, GPU, SoC, NoC, ASIC, etc.) obtaining messages from a message queue/topic and extracts various information from these messages/data by parsing/processing and preferably combines with the original message and then forwards to another message queue/topic in an asynchronous way. It is in the field of systems and methods for data parsing/processing and enrichment that includes at least one hardware accelerator/finite state automata and parametrically initiated threads for processing and enriching the retrieved message in multiple cores of processors. These result in a data parser/processor or enricher that can be scaled in both horizontally and vertically for multiple areas of applications.

7 Claims, 2 Drawing Sheets

(56) References Cited

U.S. PATENT DOCUMENTS

| | | | | |
|---|---|---|---|---|
| 2009/0070459 A1* | 3/2009 | Cho | .................... | H04L 63/1416 |
| | | | | 709/224 |
| 2009/0089658 A1* | 4/2009 | Chiu | ................... | G06F 40/205 |
| | | | | 715/234 |
| 2013/0304742 A1* | 11/2013 | Roman | ................ | H04L 51/212 |
| | | | | 707/740 |
| 2016/0098450 A1* | 4/2016 | Tandon | ............... | G06F 16/2455 |
| | | | | 707/718 |
| 2016/0267142 A1* | 9/2016 | Cafarella | .......... | G06F 16/24568 |
| 2016/0283237 A1* | 9/2016 | Pardo | .................. | G06F 9/30038 |
| 2017/0329821 A1* | 11/2017 | Agrawal | ............... | G06F 16/245 |
| 2021/0097047 A1* | 4/2021 | Billa | .................... | G06F 9/3877 |
| 2021/0097082 A1* | 4/2021 | Billa | .................. | G06F 16/9024 |
| 2021/0097108 A1* | 4/2021 | Goyal | ..................... | G06F 9/323 |
| 2021/0294662 A1* | 9/2021 | Goyal | ................... | G06F 16/9014 |
| 2021/0295181 A1* | 9/2021 | Goyal | ................... | G06F 9/4498 |

\* cited by examiner

METHOD AND APPARATUS FOR HARDWARE ACCELERATED DATA PARSING, PROCESSING AND ENRICHMENT

CROSS REFERENCE TO THE RELATED APPLICATIONS

The application is a national stage entry of PCT/TR2020/050589 filed on Jul. 6, 2020, which claims priority to TR 2020/10610 filed on Jul. 3, 2020, the entire contents of which are incorporated herein by reference.

TECHNICAL FIELD

The invention disclosed relates a data parser/processor and enricher accelerated by making use of at least one 'hardware accelerator or a finite state automata' (100) (i.e. FPGA, CPLD, GPU, SoC, NoC, ASIC, etc.) obtaining messages from a 'message queue/topic' (204) and extracts various information from these messages/data by parsing/processing and preferably combines with the 'original message' (301) and then forwards to another 'message queue/topic' (204) in an asynchronous way. It is in the field of systems and methods for data parsing/processing and enrichment that includes at least one 'hardware accelerator/finite state automata' (100) and parametrically initiated threads for processing and enriching the retrieved message in multiple cores of processors. These result in a data parser/processor or enricher that can be scaled in both horizontally and vertically for multiple areas of applications.

Figure 1:
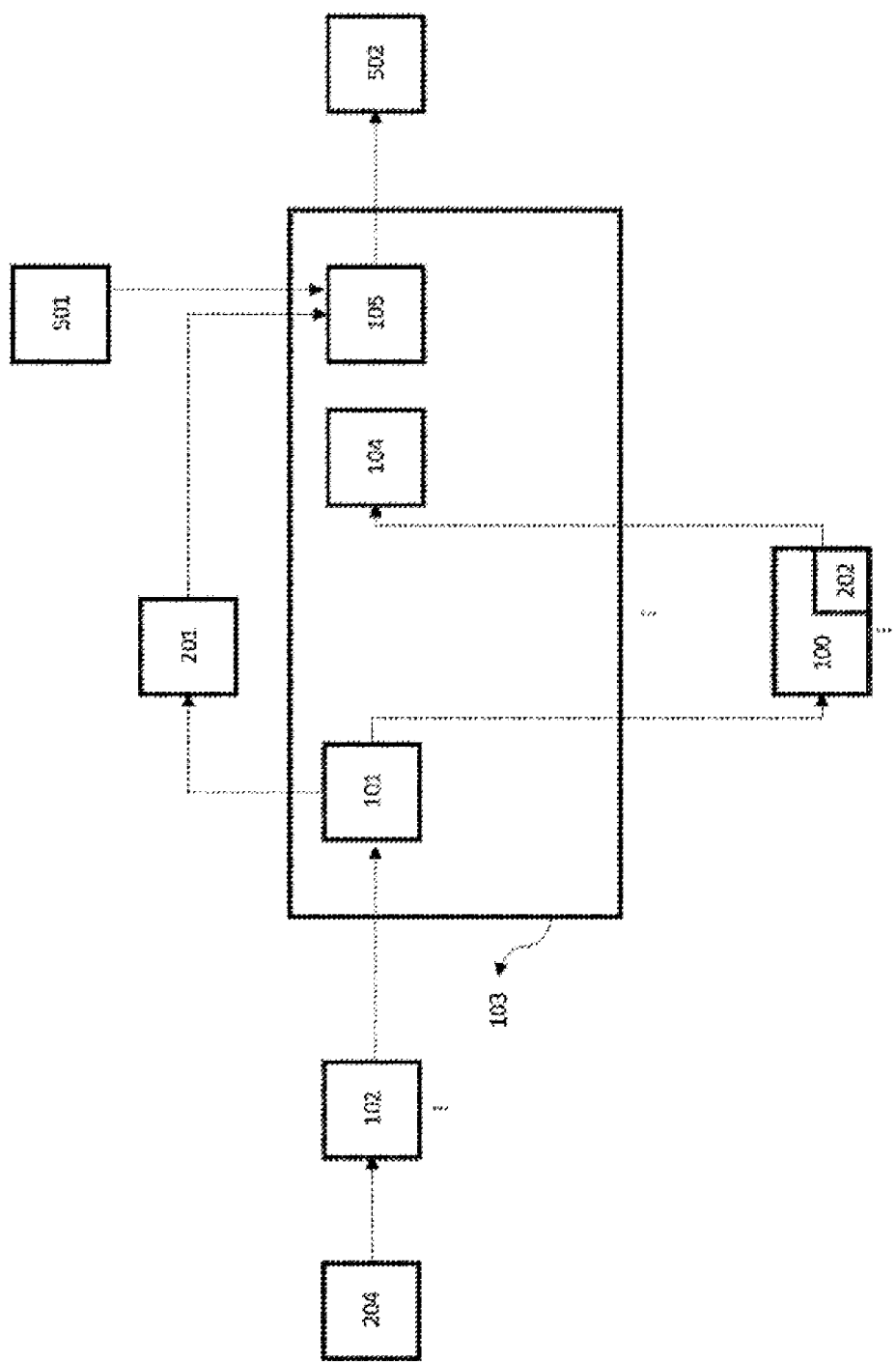
FIG. 1 shows a schematic representation of the invention disclosed with a single 'parser/processor block' (103) and a distinct 'consumer' (102) layout. This indicates the basic enricher with base level embodiments being accelerated and scalable.
Figure 2:
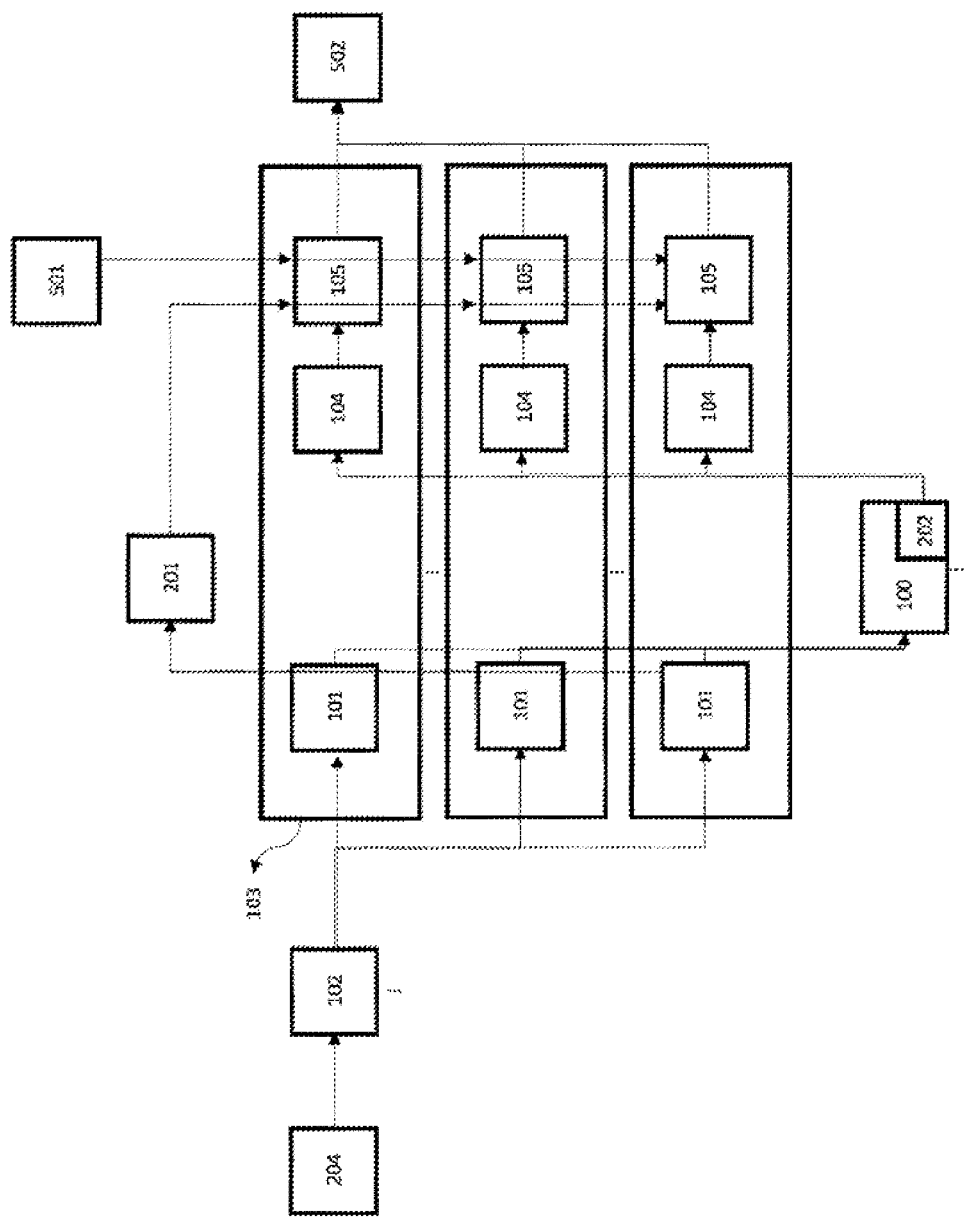
FIG. 2 shows a schematic representation of the invention disclosed with multiple 'parser/processor block' (103) and a distinct 'consumer' (102) layout. This indicates the fundamental multi-thread asynchronous operation with multiple parser blocks. Although the figure shows a limited number of 'parser/processor blocks' (103) this solely aims a concrete graphic representation.

Note that the triple points given in the figures represent the singularity and plurality of the associated blocks. These associated blocks are the 'hardware accelerator/finite state automata' (100), 'consumer(s)' (102) and 'parser/processor blocks' (103). These blocks can be one or many.

Also note that the relationship between the 'consumer(s)' (102) and parser block(s) can be configured as one-to-one, one-to-many and many-to-many feeding of parser block(s) by the consumer(s).

REFERENCING NUMERALS

100—Hardware Accelerator/Finite State Automata
101—Transfer Thread
102—Consumer(s) (Consumer Thread(s))
103—Parser/Processor Block
104—Receiver Thread
105—Worker Thread
106—Load Balancer Thread
201—Job Lookup Table
202—Regular Expressions Rules List
203—Task Queue
204—Message Queue/Topic
301—Original Message
302—Job 1D
303—Job Response
304—Regular Expressions Rule
305—Final Match Index
306—Pre-compiled Regular Expressions
400—InputMessage
401—Meaningful Data Characteristics
402—Starting Offset of the Meaningful Data
403—Length of Meaningful Data
404—Enriched Message
405—Parsed Message
500—Input Queue/Topic
501—Pre-compiled Regular Expressions Content Lookup Table
502—Output Queue/Topic
503—Worker Task Tuple

DETAILED DESCRIPTION OF THE EMBODIMENTS

The invention disclosed is a hardware accelerated data parser/processor comprising at least one 'hardware accelerator/finite state automata' (100) (i.e. FPGA, CPLD, GPU, SoC, NoC, ASIC, etc.) that gathers specific portion(s) or the entire of the 'original message' (301) extracted from the 'message queue/topic' (204) to form the 'input message(s)' (400). At first instance, the messages are taken from a 'message queue/topic' (204) one after the other by 'consumer(s)' (102).

The mentioned 'input message' (400) is generated by extracting some portion(s) of the 'original message' (301) or using the 'original message' (301) as is which is taken from the 'message queue/topic' (204). The 'input message' (400) part is the meaningful string of data, that needs to be parsed and then optionally merged with the 'original message' (301) for the data enrichment process. The determination of 'input message' (400) and the defining 'meaningful data characteristics' (401) of it may depend on the purpose of the process, so it is left to the person who determines the initiation of the invention disclosed.

The 'original messages' (301) are consumed from a messaging/data queue scheme which is declared as 'input queue/topic' (500) by the 'consumer(s)' (102). 'Consumer(s)' (102) standardizes the 'original messages' (301) of the 'input queue/topic' (500) into a well-defined structure and forwards to the 'Parser/Processor Block' (103). Note that the mentioned well defined structure comprises of the meaningful string of data (i.e. the 'input message' (400) which is a function of the 'original message' (301) and 'meaningful data characteristics' (401)). For the sake and clarity of this invention disclosed 'meaningful data characteristics' (401) are given as the offset and length characteristics (the 'starting offset of the meaningful data' (402) and the 'length of the meaningful data' (403)) of 'original message' (301) for having a better understanding.

The 'Parser/Processor block' (103) comprises of three types of threads which are initiated parametrically. The 'Transfer thread' (101), 'Receiver thread' (104), and 'Worker thread' (105). The 'Transfer thread' (101) and 'Receiver thread' (104) are bounded together and initiated with only one parameter which specifies the number of Transfer and Receiver pairs and the number of 'Worker threads' (105) are initiated with a single parameter and bounded to a specific 'Transfer thread' (101) and 'Receiver thread' (104) pair. By doing so, 'Parser/Processor blocks' (103) are initiated parametrically and can be scaled by using these two thread initiation parameters which determine the number of 'Transfer thread' (101) and 'Receiver thread' (104) pairs and its corresponding 'Worker threads' (105).

Note that the 'consumer(s)' (102) can be merged with the 'Transfer thread(s)' (101) optionally. When the 'consumers' (102) are initiated as separate threads, it can provide a more flexible structure. Such as a single 'consumer' (102) can feed multiple 'Parser/Processor Blocks' (103) or multiple 'consumers' (102) can feed a variable number of 'Parser/Processor Blocks' (103).

The 'Transfer thread' (101) generates the 'input message' (400) by extracting some portions of the said 'original message' (301) or using the said 'original message' (301) as is and determines the meaningful characteristics of this data (i.e. 'meaningful data characteristics' (401) which is comprised of the 'starting offset of the meaningful data' (402) and the 'length of the meaningful data' (403) which are indicated for having a better understanding of the entire system). After that the original message (301) is indexed into the 'Job Lookup Table' (201) with a unique key 'job id' (302) along with the 'meaningful data characteristics' (401) (i.e. the 'starting offset of the meaningful data' (402) and the 'length of the meaningful data' (403)) for the latter enrichment process.

After that, the 'input message' (400) is sent to the 'Hardware Accelerator/Finite State Automata' (100) along with its reference id number, the 'job id' (302), for the 'Regular Expressions Rules' (304) matching process.

The 'Hardware Accelerator/Finite State Automata' (100) compares the incoming data 'input message' (400) with the 'Regular Expressions Rules List' (202) that has been previously loaded into the memory which is directly connected to the 'Hardware Accelerator/Finite State Automata' (100) The mentioned 'Hardware Accelerator/Finite State Automata' (100) does not do the operation as whole, but only compares the 'input message' (400) with the 'Regular Expressions Rules List' (202) in parallel and outputs the matching 'Regular Expressions rules' (304) as 'job responses' (303) associated with the corresponding 'job id' (302) of the 'input message' (400).

The 'Hardware Accelerator/Finite State Automata' (100) outputs at least one 'Regular Expressions rule' (304) from the 'Regular Expressions Rules List' (202) that matches the 'input message' (400), without a delay from other sources or waiting for other messages in the queue which constitutes the nature of the asynchronous operation. Besides, the operation of the 'Hardware Accelerator/Finite State Automata'(100) here need and should not to be synchronous in the manner of input output aspects; the matched 'Regular Expressions rules' (304) indices (i.e. 'job responses' (303)) from the 'Regular Expressions Rules List' (202) are outputted from the 'Hardware Accelerator/Finite State Automata' (100) whenever it finishes the 'Regular Expressions rules' (304) matching process of the 'input message' (400) that was being processed and made available to be received by the 'Receiver thread' (104) in order to determine the exact match result (i.e. 'final match index' (305)).

The 'job response' (303) generated by the 'Hardware Accelerator/Finite State Automata' (100) after having completed the matching of the 'input message' (400) with the 'Regular Expressions Rules List' (202) are sent to the 'Receiver thread' (104). Note that the 'job response' (303) contains the matched 'Regular Expressions rules' (304) indices and their relevant 'job id' (302). The 'Receiver thread' (104) determines the most accurate/coherent matching result based on the 'job response' (303) and generates the 'final match index' (305) for the corresponding 'job id' (302) and consecutively dispatches this tuple of dual info ('job id' (302) and 'final match index' (305) which is the 'Worker Task Tuple' (503)) to its associated pool of 'Worker threads' (105) which belongs to the same 'Parser/Processor Block' (103) one by one in a round-robin/cyclic way. Note that the determination logic of the 'final match index' (305)) is left to the person skilled in the art who determines and implements the application of the invention disclosed by known means of comparison.

'Worker threads' (105) are responsible for data parsing and enrichment. These threads are initiated parametrically and can be also scaled in real-time system operation based on the system load. Optionally, a separate 'load balancer thread' (106) which observes the load of the system can adjust the initiation parameter of the number of worker threads in real-time. Therefore this can result in having a dynamic 'worker thread' (105) structure that can adapt to the load of the system during the most demanded durations.

Each associated 'worker thread' (105) has its own 'task queue' (203). Note that whenever a new dual info of 'job id' (302) and 'final match index' (305) (i.e. Worker Task Tuple (503)) is generated by the 'Receiver thread' (104), these are immediately forwarded to 'task queues' (203) of the relevant 'Worker Threads' (105).

At this level, each 'Worker thread' (105) extracts the 'Pre-compiled Regular Ex-pressions' (306) from the 'Precompiled Regular Expressions Content Lookup Table' (501) by using 'final match index' (305) value obtained from the 'task queue' (203), the 'Worker thread' (105) also extracts the 'original message' (301), from the 'Job Lookup Table' (201) by referring to its 'job id' (302). Note that all of these parametrically initiated 'Worker threads' (105) are working independently from each other and they execute the same algorithm for parsing and enrichment. Here it has to be also noted that the 'Precompiled Regular Expressions Content Lookup Table' (501) contains the precompiled version of the 'Regular Expressions Rules List' (202) which expedites the Perl Compatible Regular Expressions parsing operation by calling the 'Pre-compiled Regular Expressions' (306) and applying it to the 'input message (400). Having gathered the original indexed message, 'original message' (301), from the 'Job Lookup Table' (201), the 'Worker thread' (105) constitutes the previously processed 'input message' (400) from it by using the 'meaningful data characteristics' (401) (i.e. the 'starting offset of the meaningful data' (401) and the 'length of the meaningful data' (402)) which are also collected from the 'Job Lookup Table' (201) and applying it on the 'original message' (301). Note that for the scope of this invention, these two in-formation (the 'starting offset of the meaningful data' (402) and the 'length of the meaningful data' (403)) is given for having a better understanding of the entire system, determination process of 'meaningful data characteristics' (401) of the 'original message' (301) and thus the 'input message' (400) is left to the person who is re-sponsible for the initiation of the system. Then by using this regenerated 'input message' (400) with the 'Pre-compiled Regular Expressions' (306) from the 'Precompiled Regular Expressions Content Lookup Table' (501), the parsing operation is done and then the 'original message' (301) is enriched to form the 'enriched message' (404) by merging with the parsed fields (i.e. the 'parsed message' (405)) of the 'input message' (400). This 'enriched message' (404) is then forwarded to the 'output queue/topic' (502) by the 'Worker threads' (105). If the parsing option is preferred solely, then only the 'parsed message' (405) is forwarded to the 'output queue/topic' (502).

If required, only the data parsing portion of the disclosed invention can be handled by only using the 'Hardware Accelerator/Finite State Automata' (100), the 'Transfer thread' (101), the 'Receiver thread' (104), 'Worker threads' (105) and 'Precompiled Regular Expressions Content Lookup Table' (501); while the 'Job Lookup Table' (201) is disabled and 'Worker threads' (105)'s data enrichment parameter is disabled so that no message is recalled by the 'Worker threads' (105) from the 'Job Lookup Table'(201) table for merging with the parsed fields, the invention disclosed will function as a data parser only. With full capabilities, the invention disclosed will function as a data enricher.

The invention disclosed provides its main feature by avoiding the use of for loops used in 'Regular Expressions' match scanning and maintaining the maximum quality of service regardless of the size of the 'Regular Expressions Rules List' (202) (due to the nature of the parallel processing of the 'regular expressions rules' (304) inside the 'Hardware Accelerator/Finite State Automata (100), it generates no difference between having one regular expressions against having many number of regular ex-pressions which can be loaded and accepted by the memory size of the 'Regular Ex-pressions Rules List' (202)) and therefore reducing the CPU resource allocation drastically and making more parsing/enriching jobs available by the very same hardware. Thus, provides better resource allocation and better performance improvement which is up to x5-x30 of acceleration when compared with the conventional methods known in the state of art. The acceleration amount is dependent on the choice of application, in applications which require thousands of Regular Expressions, the invention disclosed can provide a x30 of acceleration and better resource allocation in terms of thread utilization, whereas for the applications which requires lesser amount of regular expressions such as between the amounts of 100 to 300, the invention can provide a minimum of x5 of acceleration.

Another advantage of the invention disclosed is its ability to apply a non-static rule set. As rules are stored in a distinct element, namely 'Regular Expressions Rules List' (202) and 'Precompiled Regular Expressions Content Lookup Table' (501), the ruleset of the operation need not to be constant. By such an architecture, one may reinitiate or incrementally update the ruleset by applying a regular file modification (i.e. injection of at least one new rule to an existing set.) This makes further applications available such as implementation of automatic methods for 'Regular Expressions rule' (304) amendments, optimization or substitution in part or as a whole. Even during the operation, a user may modify rules without interrupting the system, for example automatic/manual generation of specific 'Regular Expressions rules' (304) by analyzing the unparsed data which falls into a different messaging queue/topic and then the system can periodically update or reinitiate the 'Regular Expressions Rules List' (202) and 'Precompiled Regular Expressions Content Lookup Table' (501) during the system operation. This makes data parsing and enrichment operations much more effective and robust, reducing the overall relative ratio of unclassified data.

It has to be noted that, in certain applications in the state of the art, a physical core may not correspond to a single thread, it constitutes a lower bound only. For example, in the case of Hyper-threading supported CPUs, a single physical core acts as dual logical cores and thus it can handle two threads. Hyper-threading upper limits may change in terms of supported logical cores/threads per physical CPU core. The invention disclosed is multithreaded and it is future-proof in terms of logical core support. Operator of the disclosed invention/system can manually initiate Of automatically adjust the number of the threads parametrically by using a separate load balancer observing the load of the system and monitoring the available free logical cores/threads.

The invention disclosed has various high-performance applications in various fields of industry. Primarily it can be used for log parsing and file/packet content analysis in the computer security field. With certain modifications it can serve as a basis for Next-gen Firewalls, security information event management and network centric data leakage prevention systems in the cyber security domain. Besides, it can be used for the acceleration of signature scanning operations of anti-virus systems and the like. It may be used to handle bioinformatics analysis, such as genome data matching based on regular expressions. Besides, it may be used for biometrics analysis such as analyzing and matching fingerprints and any biometrics data which can be uniquely transformed into bytes of raw data. It can also be employed for lexicon-based sentiment analysis (i.e. analyzing and determining the sentiment of social media text data and merging the sentiment result with the original text).

The invention claimed is:

1. A data parsing and processing method configured to work on a scalable system, wherein the system comprises at least one-hardware accelerator and finite state automata, a consumer, at least one parser or processor block each comprising at least one transfer thread, a receiver thread, worker threads, and preferably a load balancer thread; as connected to each other on a single board or on distinct locations wherein a messages queue or topic consisting of input messages are retrieved and processed to obtain an enriched message or parsed message; wherein the data parsing and processing method comprises:
   a. retrieving messages from the input queue for topic by the consumer in a well-defined structure previously saved;
   b. forwarding the structured message from the consumer(s) to the parser/processor block or one of the parser or processor blocks where there are more than one parser blocks;
   c. the transfer thread, being in one parser or processor block, generating an input message by means of extraction; the original message being saved as an entry to job lookup table and assigning onto the message a job id and meaningful data characteristics which is comprised of starting offset of the meaningful data and length of the meaningful data;
   d. the hardware accelerator or finite state automata, being connected to the transfer thread, retrieving the job id and the input message; running an accelerated regular expressions rule matching process in between a preloaded regular expressions rules list and the input message; without any delay due to asynchronous behavior of the whole system and other threads or operations;
   e. outputting, by the hardware accelerator or finite state machine, at least one index of one or more regular expressions rule from the preloaded regular expressions rules list and the
   job id constituting a job response retrieved by the receiver thread;

f. the output job responses of the hardware accelerator or finite state automata being retrieved by the receiver thread along with the job id, the final match index is generated to forward to a worker thread;

g. the worker thread extracting the pre-compiled regular expressions from a precompiled regular ex-pressions content lookup table by using the final match index and re-generating the input message by collecting and then processing the original message with the meaningful data characteristics of the job lookup table by using the job id to generate parsed message;

h. the generated parsed message forwarded to an output queue or topic by the worker threads is preferably merged with the original message prior to forwarding to form the enriched message thus the system has the option of data enrichment or data parsing.

2. The data parsing and processing method according to claim 1, wherein the transfer thread is a single thread wherein these-two separate operations can be handled in the single thread or merged into one.

3. The data parsing and processing method according to claim 1, wherein at least one of the one or more regular expressions rules are loaded to the preloaded regular expressions rules list and Pre-compiled Regular Expressions prior to the start of the operations.

4. The data parsing and processing method according to claim 1, wherein at least one new or additional regular expressions rule is injected or modified to and inside the regular expressions rules list and Pre-compiled Regular Expressions during parsing or enrichment operation.

5. The data parsing and processing method according to claim 1, wherein a determination of the meaningful data characteristics is any kind of data representation besides or other than the starting offset of the meaningful data and length of the meaningful data which is a function of Transfer thread and based on the original message to describe the input messages.

6. The data parsing and processing method according to claim 1, wherein a determination of the final match index which is part of the receiver threads involves multiple execution steps and involves multiple interaction with the hardware accelerator and finite state automata to process and involve one or many job responses for a coherent determination.

7. The data parsing and processing method according to claim 1, wherein the process used in the worker threads of the method is a defined process and workflow that uses all or some portion of the structures described in claim 1.

* * * * *